(12) United States Patent
Matsuzaki et al.

(10) Patent No.: US 12,371,543 B2
(45) Date of Patent: Jul. 29, 2025

(54) HARD COAT FILM

(71) Applicant: NIPPON PAPER INDUSTRIES CO., LTD., Tokyo (JP)

(72) Inventors: Morio Matsuzaki, Higashimatsuyama (JP); Yasuaki Yoshida, Higashimatsuyama (JP); Hirosuke Tsunoda, Higashimatsuyama (JP); Narihiro Iio, Higashimatsuyama (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 338 days.

(21) Appl. No.: 15/545,894

(22) PCT Filed: Jan. 23, 2016

(86) PCT No.: PCT/JP2016/051943
§ 371 (c)(1),
(2) Date: Jul. 24, 2017

(87) PCT Pub. No.: WO2016/117706
PCT Pub. Date: Jul. 28, 2016

(65) Prior Publication Data
US 2018/0016405 A1    Jan. 18, 2018

(30) Foreign Application Priority Data
Jan. 25, 2015 (JP) .................. 2015-011885

(51) Int. Cl.
B32B 27/00 (2006.01)
C08J 7/04 (2020.01)
(Continued)

(52) U.S. Cl.
CPC ............... C08J 7/043 (2020.01); B32B 27/00 (2013.01); C08J 7/042 (2013.01); C08J 7/0427 (2020.01);
(Continued)

(58) Field of Classification Search
CPC ............. G02B 1/105; G02B 1/14; C09D 123/10–16; C09J 123/10–16;
(Continued)

(56) References Cited

U.S. PATENT DOCUMENTS 5,225,483 A * 7/1993 Datta .................. C08L 23/10
524/516
6,489,028 B1 * 12/2002 Degand ............... G02B 1/105
351/159.57
(Continued)

FOREIGN PATENT DOCUMENTS

JP    2004-284158 A    10/2004
JP    2004-287123 A    10/2004
(Continued)

OTHER PUBLICATIONS

Machine translation of JP2004284158A, Oct. 14, 2004, retrieved from patents.google.com on Apr. 28, 2019 (Year: 2004).*
(Continued)

*Primary Examiner* — Callie E Shosho
*Assistant Examiner* — Steven A Rice
(74) *Attorney, Agent, or Firm* — Sughrue Mion, PLLC (57) ABSTRACT

The present invention provides a hard coat film that is provided with a hard coat layer via an easy-bonding layer on at least one surface of a cycloolefin film, has excellent temporal adhesiveness under normal condition and under moisture and heat resistant condition, and has no crack occurrence under the heat resistant condition. A hard coat film 10 of the present invention is provided with a hard coat layer 3 via an easy-bonding layer 2 on at least one surface of a cycloolefin film 1. The easy-bonding layer 2 includes a mixture of a polyolefin based resin and a styrene-acryl based resin, and a blending ratio thereof is in the range of, for example, from 95/5 to 40/60. Further, the hard coat layer 3
(Continued)

includes an ionizing radiation curable resin having a weight-average molecular weight of 700 or larger and 3600 or smaller.

3 Claims, 1 Drawing Sheet

(51) Int. Cl.
*C08J 7/043* (2020.01)
*C08J 7/046* (2020.01)

(52) U.S. Cl.
CPC ........... *C08J 7/046* (2020.01); *C08J 2323/20* (2013.01); *C08J 2365/00* (2013.01); *C08J 2423/16* (2013.01); *C08J 2425/08* (2013.01); *C08J 2433/06* (2013.01)

(58) Field of Classification Search
CPC .......... C08J 7/042; C08J 7/043; C08J 7/0427; C08J 7/046; C08J 2323/20; C08J 2365/00; C08J 2423/16; C08J 2425/08; C08J 2433/06; B32B 27/00; B32B 27/30; B32B 27/08; B32B 27/32; B32B 27/325
USPC ........................................................ 428/520
See application file for complete search history.

(56) References Cited

U.S. PATENT DOCUMENTS

| | | | | |
|---|---|---|---|---|
| 2003/0035926 | A1* | 2/2003 | Higashi | B05D 5/02 428/141 |
| 2005/0091935 | A1* | 5/2005 | Amano | B29C 45/14311 52/204.591 |
| 2007/0082209 | A1* | 4/2007 | Williams | C09D 151/06 428/474.4 |
| 2008/0075948 | A1* | 3/2008 | Padiyath | B32B 27/20 428/328 |
| 2008/0131674 | A1* | 6/2008 | Kondo | C09D 175/16 428/212 |
| 2010/0009151 | A1 | 1/2010 | Yun et al. | |
| 2012/0202053 | A1* | 8/2012 | Iseki | C09J 123/142 428/334 |

FOREIGN PATENT DOCUMENTS

| | | | |
|---|---|---|---|
| JP | 2005281537 A | * | 10/2005 |
| JP | 2006-110875 A | | 4/2006 |
| JP | 2010-514894 A | | 5/2010 |

OTHER PUBLICATIONS

Machine translation of JP 2005-281537 A (Year: 2005).*
International Search Report of PCT/JP2016/051943, dated Mar. 22, 2016. [PCT/ISA/210].

* cited by examiner

HARD COAT FILM

CROSS REFERENCE TO RELATED APPLICATIONS

This application is a National Stage of International Application No. PCT/JP2016/051943 filed Jan. 23, 2016, claiming priority based on Japanese Patent Application No. 2015-011885, filed Jan. 25, 2015, the contents of all of which are incorporated herein by reference in their entirety.

TECHNICAL FIELD

The present invention relates to a hard coat film, in more detail, to a hard coat film provided with a hard coat layer via an easy-bonding layer on a cycloolefin film, which may be used as display decoration parts of flat panel displays and touch panels of liquid crystal display devices, plasma display devices, and electroluminescent display devices, and protective films of window glasses for buildings, automobiles, trains and so on.

BACKGROUND ART

It is required to provide the scratch resistance to a display surface of a flat panel display such as a liquid crystal display device (LCD) such that the visibility may not be degraded when damaged during handling. Therefore, it is common to provide the scratch resistance by using a hard coat film provided with a hard coat layer on a base film. In recent years, due to popularization of a touch panel that may input data or instructions by touching with a finger or a pen while seeing a display on a display screen, a mechanical demand for a hard coat film having maintenance of the optical visibility and the scratch resistance is increasing.

Therefore, a cycloolefin film having excellent transparency, heat resistance, dimensional stability, low absorbency, low birefringence, and optical isotropy as a base film is expected to be used for optical members and it is performed to provide a hard coat layer on the cycloolefin film. However, because the cycloolefin film has a slighter amount of polar groups on a film surface different from an acryl film or a polyester film, there was a problem that the adhesiveness between the base film and the hard coat layer is insufficient.

There, methods of providing an easy-bonding property with the hard coat layer to the cycloolefin film have been disclosed in Patent Literatures 1 and 2 or the like.

CITATION LIST

Patent Literature

Patent Literature 1: JP 2001-147304 A
Patent Literature 2: JP 2006-110875 A

SUMMARY OF INVENTION

Technical Problem

As a conventional method of providing an easy-bonding property with a hard coat layer to a cycloolefin film, Patent Literature 1 discloses a Corona treatment, a plasma treatment, a UV treatment and the like. However, there has been a problem that these methods are insufficient in the adhesiveness between the cycloolefin film and the hard coat layer, and, in particular, temporal adhesiveness failure tends to occur.

Further, Patent Literature 2 discloses to coat an anchor coat agent made of an olefin based resin on a cycloolefin film. According to this anchor coat treatment, the adhesiveness between the cycloolefin film and the hard coat layer may be improved by some degree. However, there has been a problem that between the anchor coat layer where a coated film has flexibility and elongation and the hard coat layer where a coated layer is hard and does not elongate, due to a contraction difference between both coated films under heat resistant condition (for example, preservation in a dryer at 100° C. for 5 minutes), cracks (film cracks, flaws) tend to occur on a surface of the hard coat layer.

Therefore, in the conventional hard coat film, there were problems of the adhesiveness (particularly, the temporal adhesiveness) with the hard coat layer when the cycloolefin film is used as a base material, and prevention of occurrence of cracks under the heat resistant conditions.

There, the present invention intends to provide a hard coat film that is provided with a hard coat layer via an easy-bonding layer on at least one surface of a cycloolefin film, has excellent temporal adhesiveness under normal condition and the moisture and heat resistant condition, and has no crack occurrence under the heat resistant condition. Further, it is also intended to provide a hard coat film having suppressed curl and excellent processing suitability.

Solution to Problem

The inventors of the present invention have studied hard to solve the above problems and found that the problems may be solved by proving the following constitution.

That is, the present invention has the following constitution.

A first invention is a hard coat film provided with a hard coat layer via an easy-bonding layer on at least one surface of a cycloolefin film, the easy-bonding layer containing a mixture of a polyolefin based resin and a styrene-acryl based resin, the hard coat layer containing an ionizing radiation curable resin having an weight-average molecular weight of 700 or larger and 3600 or smaller.

Further, a second invention is a hard coat film having a blending ratio (parts by weight) of the polyolefin based resin and the styrene-acryl based resin in the range of from 95/5 to 40/60 in the easy-bonding layer in the first invention.

Further, a third invention is a hard coat film in which the ionizing radiation curable resin contains a polyfunctional acrylate having 3 or more (meth)acryloyloxy groups in one molecule in the first or second invention.

Further, a fourth invention is a hard coat film having the hard coat layer satisfying the following conditions in the invention according to any one of the above 1 to 3.

Conditions: On a polyethylene terephthalate film, a film on which a hard coat layer made of the ionizing radiation curable resin cured by a UV-ray amount of from 50 to 1000 mJ/cm$^2$ is formed such that a coated film has a thickness of 2 μm is formed. Then, when a test piece having width 15 mm×length 150 mm is prepared from said film and said test piece is subjected to a tensile test at a tensile speed of 50 mm/minute under the environment of temperature of 23° C. and humidity of 50% RH, an elongation rate until the crack is generated on the coated film is 8% or larger and 45% or smaller.

Further, a fifth invention is a hard coat film having a thickness of the easy-bonding layer in the range of from 0.1 μm to 1.0 μm in the invention according to any one of the first to the fourth inventions.

Advantageous Effects of Invention

According to the present invention, a hard coat film that is provided with a hard coat layer via an easy-bonding layer on at least one surface of a cycloolefin film, has excellent temporal adhesiveness under normal condition and under the moisture and heat resistant condition, and has no crack occurrence under the heat resistant condition is obtained.

Further, according to the present invention, a hard coat film having suppressed curl and excellent processing suitability may be obtained.

DESCRIPTION OF EMBODIMENTS

In what follows, embodiments for carrying out the present invention will be described in detail. However, the present invention is not limited to the following embodiments.

Here, in the present specification, unless clearly stated otherwise, "from xx to yy" means "xx or larger and yy or smaller".

Figure 1:
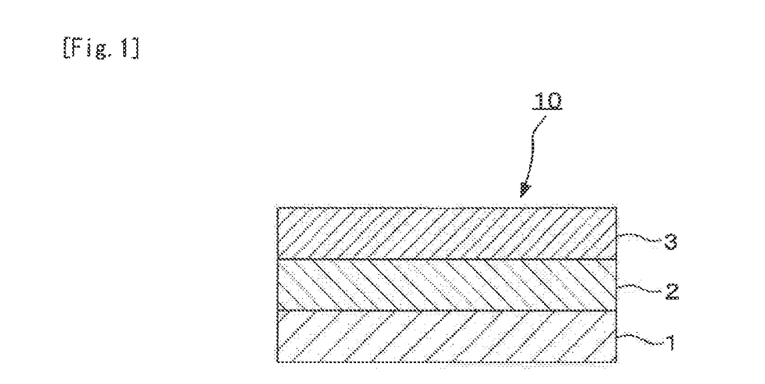
FIG. 1 is a cross-sectional view showing a layer structure of one embodiment of a hard coat film according to the present invention.

As shown in FIG. 1, a layer structure of a hard coat film 10 according to one embodiment of the present invention is provided with a hard coat layer 3 via an easy-bonding layer 2 on at least one surface of a cycloolefin film 1 that is a base film, the easy-bonding layer 2 contains a mixture of a polyolefin-based resin and a styrene-acryl based resin, and on the easy-bonding layer 2 a hard coat layer containing an ionizing radiation curable resin is formed.

Base Film

First, the base film of a hard coat film will be described.

In the present invention, as the base film of the hard coat film 10, a cycloolefin film having excellent transparency, heat resistance, dimensional stability, low absorbency, low birefringence, and optical isotropy is used. Specifically, a film of a cycloolefin copolymer or a film of a cycloolefin polymer, which is a (co)polymer having an alicyclic structure in a molecular structure by polymerizing cycloolefins units alternately or randomly in a polymer skeleton, and containing at least one kind of compound selected from a norbornene-based compound, a monocyclic olefin, a cyclic conjugate diene and a vinyl alicyclic hydrocarbon is a target and any one thereof may be used by appropriately selecting.

Further, in the present invention, a thickness of the above cycloolefin film 1 is appropriately selected in accordance with an application by which the hard coat film is used. However, from the viewpoint of mechanical strength, handling and the like, the thickness is preferably in the range of from 10 μm to 300 μm, and more preferably in the range of from 20 μm to 200 μm.

In the present invention, regarding the heat resistance of the above cycloolefin film 1, in the case of applying for the hard coat film, it is preferable to use a film having the glass transition temperature measured by such as a thermogravimetric measurement (TG) method or a differential scanning calorimetry measurement (DSC) method that measures a heat change when a temperature variation is applied to a sample of from about 120° C. to 170° C.

In the present invention, the cycloolefin film 1 may use, in the case of applying for the hard coat film, in order to prevent a coated film from deteriorating or causing adhesion failure due to UV-ray, a film obtained by forming a resin in which a cycloolefin resin and a UV-absorbing agent are kneaded into a film-like shape or a film obtained by coating a coating material obtained by mixing a thermoplastic or thermosetting resin and the UV-absorbing agent on one surface or both surfaces of the cycloolefin film. Regarding the UV-cut property, the transmittance at a wavelength of 380 nm by a spectrophotometer is preferably 10% or smaller. More preferably, the transmittance is 7% or smaller.

Easy-Bonding Layer

Next, the above easy-bonding layer 2 will be described.

In the present invention, the above easy-bonding layer 2 is necessary to contain a mixture of the polyolefin based resin and the styrene-acryl based resin.

In the present invention, the polyolefin based resin that constitutes the above easy-bonding layer 2 is a resin that is blended to provide the adhesiveness with the cycloolefin film 1 and the hard coat layer 3. The present inventors studied hard about a resin for an easy-bonding layer having excellent adhesiveness with both the cycloolefin film 1 and the hard coat layer 3 and found that a polyolefin based resin having excellent flexibility is suitable.

The polyolefin based resin used for the above easy-bonding layer 2 in the present invention is not restricted particularly. However, as one having excellent adhesiveness with a base material (cycloolefin film), one that constitutes a copolymer from two or more kinds of monomers such as an ethylene-propylene copolymer, a propylene-butene copolymer or the like is preferable, and particularly one containing a propylene monomer in the copolymer is preferable. Further, although also the molecular weight thereof is not particularly restricted, one having the weight-average molecular weight in the range of from 10,000 to 200,000 is preferable from the viewpoint of balance between the flexibility and the adhesiveness. As such polyolefin based resin, for example, commercially available UNISTOLE (trade name, manufactured by Mitsui Chemicals Inc.), SURFLEN (trade name, manufactured by Mitsubishi Chemical Co., Ltd.), ARROWBASE (trade name, manufactured by Unitika Ltd.) and AUROREN (trade name, manufactured by Nippon Paper Industries Co., Ltd.) may be used.

Now, since this polyolefin based resin is a resin having excellent flexibility, when this is provided with an easy-bonding layer and a film is wound, this tends to be readily pressured bonded. Therefore, from the viewpoint of prevention of the blocking between films, it is preferable to prevent the pressure bonding by blending a high hard resin or inorganic or organic fine particles in the easy-bonding layer, or by sticking a protective film on a back surface of the cycloolefin film.

When blending the inorganic or organic fine particles, a blending amount (parts by weight) is preferably in the range of the resin constituting the easy-bonding layer 2/inorganic or organic fine particles=99.8/0.2 to 95.0/5.0. When the blending amount of the fine particles exceeds 5.0 parts by weight, the degradation of the transparency or the degradation of the adhesiveness with the cycloolefin film unfavorably occurs. On the other hand, when the blending amount of the fine particles is smaller than 0.2 parts by weight, a sufficient effect may not be developed.

As the inorganic fine particles, fine particles of alumina, zinc oxide, silica, titanium oxide, cerium oxide or the like may be illustrated, and, as the organic fine particles, fine particles of acryl, a melamine/formamide condensate, polyethylene, styrene-acryl, polyester or the like may be illustrated. As a particle size, fine particles of, for example, 0.05

μm to 0.20 μm are preferably used. When the particle size is smaller than 0.05 μm, a pressure bonding prevention effect is unfavorably low. On the other hand, even when the particle size exceeds 0.20 μm, a larger pressure bonding prevention effect may not be obtained, a higher cost is caused, and the external haze becomes higher to tend to cause degradation of the transparency.

Further, in the present invention, the styrene-acryl based resin contained in the easy-bonding layer 2 is a polymer obtained by containing an acryl monomer and a styrene monomer alternately or randomly in a constitution unit. Since the styrene-acryl based resin is a resin blended to make a contraction difference between the easy-bonding layer 2 and the hard coat layer 3 smaller and to prevent generation of cracks under heat resistant condition, it is required to be a resin that is relatively hard and has small elongation. In the present invention, as a measure, a resin having the glass transition temperature of 50° C. or larger is desirably used. As the styrene-acryl resin like this, for example, commercially available ARUFON resin (trade name, manufactured by TOAGOSEI Co., Ltd.) or ACRIT resin (trade name, manufactured by Taisei Fine Chemicals Co., Ltd.) may be used.

In the present invention, the blending ratio (parts by weight) between the polyolefin based resin and the styrene-acryl based resin contained in the easy-bonding layer 2 is desirably in the range of from 95/5 to 40/60.

When the blending ratio of the polyolefin based resin exceeds 95 parts by weight, a formed easy-bonding layer is soft and tends to elongate. Therefore, there is a problem that due to the contraction difference with the hard coat layer that is hard and does not elongate, the cracks tend to occur under heat resistant condition (for example, preservation at 100° C. for 5 minutes), or a problem that when the hard coat layer is formed on the easy-bonding layer, the hardness of the coated film (pencil hardness) tends to degrade. On the other hand, when the blending ratio of the polyolefin based resin is smaller than 40 parts by weight, since the contraction difference between the easy-bonding layer and the hard coat layer becomes smaller, preferably, the crack generation under heat resistant condition is absent, however, there is a problem that the adhesiveness between the easy-bonding layer and the cycloolefin film degrades.

Further, a thickness of the coated film of the easy-bonding layer 2 is, though not particularly restricted, desirably in the range of from 0.1 μm to 1.0 μm, and more desirably in the range of from 0.2 μm to 0.6 μm, that is a range that does not cause an adverse effect on the adhesiveness with the cycloolefin film and the hard coat layer, or on the pencil hardness of the hard coat layer. When the thickness of the easy-bonding layer 2 is smaller than 0.1 μm, the adhesiveness with the hard coat layer unfavorably decreases. On the other hand, when the thickness of the easy-bonding layer 2 exceeds 1.0 μm, the easy-bonding layer made of a resin layer having low hardness is formed on a lower layer of the hard coat layer. Thus, unfavorably, the pencil hardness of the hard coat film degrades (for example, degradation from pencil hardness H to pencil hardness HB), further the cracks tend to occur under the heat resistant condition.

To the easy-bonding layer 2, a leveling agent may be blended to improve the coating property. For example, well-known levelling agents such as a fluorine based levelling agent, an acryl based leveling agent, a siloxane based leveling agent and adducts thereof or mixtures thereof may be used. As a blending amount, for example, it is possible to blend in the range of from 0.03 parts by weight to 3.0 parts by weight relative to 100 parts by weight of the resin component of the easy-bonding layer.

Further, to the easy-bonding layer 2, a benzotriazole based UV-absorbing agent or a benzophenone based UV-absorbing agent may be blended to provide light-resistant adhesiveness (prevention of adhesiveness failure due to UV light). A blending amount is preferably from 0.05 parts by weight to 10.0 parts by weight relative to 100 parts by weight of the resin component of the easy-bonding layer. Particularly preferably, it is from 1.0 parts by weight to 5.0 parts by weight.

Further, as another additive to be added to the easy-bonding layer 2, in the range that does not damage the effect of the present invention, a defoaming agent, an antifouling agent, an antioxidant, an antistatic agent, or a light stabilizer may be added as needs arise.

In the present invention, the easy-bonding layer 2 is formed by coating a coating material obtained by dissolving or dispersing, in addition to the polyolefin based resin and the styrene-acryl based resin, other additives in an appropriate organic solvent on the cycloolefin film 1, followed by drying, or further followed by curing. As the organic solvent in this case, an organic solvent that is a solvent capable of being appropriately selected in accordance with the solubility of the resin contained, capable of uniformly dissolving or dispersing at least a solid content (resin, other additive), and having a boiling point of from 50° C. to 160° C. from the viewpoint of workability and drying property during coating is preferably used. As the solvent like this, well-known organic solvents such as: aromatic-based solvents such as toluene, xylene and n-heptane; aliphatic-based solvents such as cyclohexane, methyl cyclohexane and ethyl cyclohexane; ester-based solvents such as methyl acetate, ethyl acetate, propyl acetate, isopropyl acetate, butyl acetate, and methyl lactate; ketone-based solvents such as acetone, methyl ethyl ketone, methyl isobutyl ketone, and cyclohexanone; and alcohol-based solvents such as methanol, ethanol, isopropyl alcohol, n-propyl alcohol and butanol may be used singularly or also in a combination of appropriate number of kinds.

In the present invention, as a method of coating the coating material for easy-bonding layer on the cycloolefin film 1, well-known coating methods such as a gravure coating method, a micro gravure coating method, a fountain-bar coating method, a slide die coating method, a slot die coating method, a screen printing method or a spray coating method may be used to coat. The coating material coated on the cycloolefin film 1 is dried usually at a temperature of from about 50 to 120° C. to remove the solvent, followed by curing by providing external energy such as heat energy or UV light or an electron beam to form a coated film.

Hard Coat Layer

Next, the above hard coat layer 3 will be described.

In the present invention, as the resin contained in the hard coat layer 3, any resin may be used without particular restriction as long as the resin may form a coated film. In particular, from the point of providing surface hardness (pencil hardness, scratch resistance) of the hard coat layer, being capable of adjusting a degree of crosslinking by an exposure amount of ultra violet light, and being capable of adjusting the surface hardness of the hard coat layer, an ionizing radiation curable resin is preferably used.

The ionizing radiation curable resin used in the present invention is not particularly restricted as long as it is a transparent resin that is cured by irradiation of ultraviolet light (hereinafter abbreviated as "UV") or an electron beam (hereinafter abbreviated as "EB"). However, in order for the coated film hardness and the hard coat layer 3 to form a three-dimensional cross-linking structure, ones made of UV- or EB-curable polyfunctional acrylate having 3 or more (meth)acryloyloxy groups in one molecule are preferable. Specific examples of the UV- or EB-curable polyfunctional acrylates having 3 or more (meth)acryloyloxy groups in one molecule include trimethylol propane tri(meth)acrylate, pentaerythritol tri(meth)acrylate, pentaerythritol tetra(meth) acrylate, dipentaerythritol tri(meth)acrylate, dipentaerythritol tetra(meth)acrylate, dipentaerythritol penta(meth)acrylate, dipentaerythritol hexa(meth)acrylate, trimethylolpropane ethoxytriacrylate, glycerin propoxy triacrylate, and ditrimethylolpropane tetracrylate. Here, the polyfunctional groups may be used singularly or in a combination of plurality of two or more kinds.

Further, as the ionizing radiation curable resins used in the present invention, a polymer having a weight-average molecular weight in the range of from 700 to 3600 is preferably used, the polymer having the weight-average molecular weight in the range of from 700 to 3000 is more preferable, and the polymer having the weight-average molecular weight in the range of from 700 to 2400 is still more preferable. When the weight-average molecular weight is smaller than 700, a curing contraction when cured by UV irradiation or EB irradiation is large, a phenomenon (curl) where the hard coat film warps on the hard coat layer surface side becomes large, and an inconvenience occurs when undergoing the processing step after that, that is, the processing suitability is poor. Further, when the weight-average molecular weight exceeds 3600, while the flexibility of the hard coat layer becomes higher, the hardness becomes unfavorably insufficient.

Further, in the case where the ionizing radiation curable resin used in the present invention has the weight-average molecular weight of smaller than 1500, the number of the functional groups in one molecule is desirably 3 or larger and smaller than 10. Further, in the case where the ionizing radiation curable resin has the weight-average molecular weight of 1500 or larger, the number of the functional groups in one molecule is desirably 3 or larger and 20 or smaller. When in the above range, while suppressing occurrence of cracks, the curl may be suppressed, and appropriate processing suitability may be maintained.

Further, as the resin contained in the hard coat layer 3, other than the ionizing radiation curable resin, a thermoplastic resin such as polyethylene, polypropylene, polystyrene, polycarbonate, polyester, acryl, styrene-acryl, or cellulose, or a thermosetting resin such as a phenol resin, a urea resin, an unsaturated polyester resin, an epoxy resin, or a silicone resin may be blended in the range that does not damage the hardness and the scratch resistance of the hard coat layer.

Further, as a photopolymerization initiator of the ionizing radiation curable resin contained in the hard coat layer 3, acetophenones such as commercially available IRGACURE 651 and IRGACURE 184 (both are trade name, manufactured by BASF), or benzophenones such as IRGACURE 500 (trade name, manufactured by BASF) may be used.

In the present invention, it is also possible to further improve the surface hardness (scratch resistance) by making inorganic oxide fine particles contain in the hard coat layer 3. In this case, an average particle size of the inorganic oxide fine particles is preferably in the range of from 5 to 50 nm, and more preferably in the range of from 10 to 20 nm. When the average particle size is smaller than 5 nm, it is difficult to obtain sufficient surface hardness. On the other hand, when the average particle size exceeds 50 nm, gloss and transparency of the hard coat layer degrade and the flexibility may also degrade.

In the present invention, as the inorganic oxide fine particles, for example, alumina and silica may be used. Among these, the alumina is particularly preferable because alumina mainly made of aluminum has high hardness and may exhibit an effect at a slighter addition amount than silica.

In the present invention, a content of the inorganic oxide fine particles is preferably from 0.1 to 10.0 parts by weight relative to 100 parts by weight of a solid content of a hard coat layer coating material composition. When the content of the inorganic oxide fine particles is smaller than 0.1 parts by weight, an improvement effect of the surface hardness (scratch resistance) is difficult to obtain. On the other hand, when the content exceeds 10.0 parts by weight, the haze unfavorably increases.

In the hard coat layer 3, the levelling agent may be used to improve the coating property. Examples of the well-known levelling agents include a fluorine base levelling agent, an acryl based levelling agent, a siloxane based levelling agent and adducts or mixtures thereof. As a blending amount, the levelling agent nay be blended in the range of from 0.03 parts by weight to 3.0 parts by weight relative to 100 parts by weight of the solid content of the hard coat layer. Further, when applying to touch panels or the like, in the case where the opposite adhesive properties using an optically transparent adhesive OCR is required for the purpose of adhesion with a cover glass (CG), a transparent conductive member (TSP), a liquid crystal module (LCM) or the like of a touch panel terminal, an acryl based levelling agent or a fluorine base levelling agent having a high surface free energy (about 40 mJ/cm$^2$ or higher) is preferably used.

As other additives to be added to the hard coat layer 3, in the range that does not damage the effect of the present invention, a defoaming agent, a surface tension controlling agent, an antifouling agent, an antioxidant, an antistatic agent, a UV-absorbing agent, or a light stabilizer may be added as needs arise.

The hard coat layer 3 is formed by coating a coating material obtained by dissolving or dispersing other than the ionizing radiation curable resin, a polymerization initiator, and other additives in an appropriate solvent, followed by drying. As the solvent, any solvent may be used as long as it is appropriately selected in accordance with the solubility of the resin to be blended and may uniformly dissolve or disperse at least the solid content (resin, polymerization initiator, and other additives). As the solvent like this, well-known organic solvents such as: aromatic-based solvents such as toluene, xylene and n-heptane; aliphatic-based solvents such as cyclohexane, methyl cyclohexane and ethyl cyclohexane; ester-based solvents such as methyl acetate, ethyl acetate, propyl acetate, isopropyl acetate, butyl acetate, and methyl lactate; ketone-based solvents such as acetone, methyl ethyl ketone, methyl isobutyl ketone, and cyclohexanone; and alcohol-based solvents such as methanol, ethanol, isopropyl alcohol, and n-propyl alcohol may be used singularly or also in a combination of appropriate number of kinds.

The coating method of the hard coat layer 3 is not particularly restricted. A well-known coating method such as a gravure coating method, a micro gravure coating method, a fountain-bar coating method, a slide die coating method, a slot die coating method, a screen printing method or a spray coating method may be used to coat, followed by drying at a temperature usually of from about 50 to 120° C.

Further, the hard coat layer 3 is preferable to satisfy the following conditions.

Conditions: On a polyethylene terephthalate film, a film on which a hard coat layer made of the ionizing radiation curable resin cured by a UV-ray amount of from 50 to 1000 mJ/cm$^2$ is formed such that a coated film has a thickness of 2 μm is formed. Then, when a test piece having width 15 mm×length 150 mm is prepared from said film and said test piece is subjected to a tensile test at a tensile speed of 50 mm/minute under the environment of temperature of 23° C. and humidity of 50% RH, an elongation rate until the crack is generated on the coated film is 8% or larger and 45% or smaller.

When the above condition is satisfied, the hard coat layer 3 is suppressed from curling, and a hard coat film having excellent processing suitability may be obtained.

In order for the hard coat layer 3 to satisfy the above condition, as the ionizing radiation curable resin contained in the hard coat layer 3, for example, EBECRYL-5129 (manufactured by Daicel-Allnex Ltd.), NK-Oligo U-6LPA (manufactured by Shin-Nakamura Chemical Co., Ltd.), Art-Resin UN-908 (manufactured by Negami Chemical Industrial Co., Ltd.), UNIDIC 17-806 (manufactured by DIC Corporation) and the like are preferably used.

A thickness of the coated film of the hard coat layer 3 is, though not particularly restricted, preferably in the range of, for example, from 1.0 μm to 15 μm. When the thickness of the coated film is smaller than 1.0 μm, necessary surface hardness may be difficult to obtain. Further, when the thickness of the coated film exceeds 15.0 μm, unfavorably, the curl occurs strongly to result in degradation of handling property in the manufacturing process or the like. Now, the thickness of the coated film of the hard coat layer 3 may be measured by actually measuring with a micrometer.

In the present invention, when a hard coat layer coating material containing the ionizing radiation curable resin is coated on the cycloolefin film having an easy-bonding layer and dried, followed by UV or EB irradiation, photopolymerization occurs to be able to obtain a coated film having excellent hardness. Particularly, the hard coat layer having the pencil hardness stipulated in JIS K5600-5-4 of B to 2H is preferable.

As was detailed in the above, when the hard coat film of the present invention is provided with the hard coat layer on at least one surface of the cycloolefin film via the easy-bonding layer and the easy-bonding layer contains a mixture of the polyolefin based resin and the styrene-acryl based resin, the adhesiveness between the cycloolefin film and the hard coat layer may be improved, in particular, the temporal adhesivenesses under the normal condition and under the moisture and heat resistant condition are excellent. Further, by reducing the contraction difference between the easy-bonding layer and the hard coat layer, even when stored under the heat resistant condition, cracks may be prevented from occurring. Further, when a degree of elongation (rate of elongation) of the hard coat layer is controlled within a predetermined range, the curl also may be suppressed.

EXAMPLES

Next, the present invention will be specifically described with reference to examples and comparative examples. However, the present invention is not limited to the following examples.

Here, unless clearly stated otherwise, "parts" and "%" described below represent "parts by weight" and "% by weight" respectively.

EXAMPLE 1

Preparation of Easy-bonding Layer Coating Material

First, 60 parts of styrene-acryl based resin "ARUFON UG-4070 (trade name)" (solid content: 100%, manufactured by TOAGOSEI Co., Ltd., glass transition temperature: 58° C.) were added little by little into 140 parts of ethyl acetate using a stirrer to dissolve the resin, and a solution having a concentration of 30% was prepared.

Then, 70 parts of polyolefin based resin "SURFLEN P-1000 (trade name)" (solid content: 20%, manufactured by Mitsubishi Chemical Co., Ltd.) and 30 parts of the styrene-acryl based resin "ARUFON UG-4070 (trade name)" (solid content: 30%) were blended and diluted with butyl acetate/toluene=85/15 (% by weight) until a solid content concentration becomes 5%, thus, an easy-bonding layer coating material was prepared.

Preparation of Hard Coat Layer Coating Material

One hundred parts of a urethane-acrylate based UV curable resin "UV-7630B (trade name)" (solid content: 100%, number of (meth)acyloyloxy groups: 6, weight-average molecular weight: 2200, manufactured by The Nippon Synthetic Chemical Industry Co., Ltd.) as a main agent, 3.5 parts of IRGACURE 184 (photopolymerization initiator, manufactured by BASF), 2.5 parts of hindered amine based light stabilizer "TINUVIN 292 (trade name)" (manufactured by BASF), and 0.3 parts of the levelling agent RS75 (fluorine based levelling agent, manufactured by DIC Corporation) were diluted with butyl acetate/n-propyl alcohol=50/50 (parts by weight) until a solid content concentration in the coating material of the UV curable resin coating material is 45%, followed by sufficiently stirring, thus a hard coat layer coating material was prepared.

By using the hard coat layer coating material, on a polyethylene terephthalate film, a film on which a hard coat layer made of the ionizing radiation curable resin cured at a UV light amount of from 50 to 1000 mJ/cm$^2$ was formed such that a coated film has a thickness of 2 μm was formed. Then, when a test piece having width 15 mm×length 150 mm was prepared from said film and said test piece was subjected to a tensile test at a tensile speed of 50 mm/minute under the environment of temperature of 23° C. and humidity of 50% RH, an elongation rate until the crack was generated on the coated film was 11.5%.

Preparation of Hard Coat Film

On one surface of ZEONOR film ZF14 (manufactured by Zeon Corporation) having a thickness of 60 μm as the cycloolefin film, the easy-bonding layer coating material was coated using a bar coater and dried and solidified by hot air drying for 1 minute using a drying furnace at 90° C., an easy-bonding layer having a thickness of coated film of 0.3 μm was formed, thus a film with an easy-bonding layer was obtained.

Next, on the easy-bonding layer of the film with the easy-bonding layer, the hard coat layer coating material was coated using a bar coater and hot air dried for 1 minute in a drying furnace at 80° C., thus a coated layer having a thickness of coated film of 5.0 μm was formed. This was cured at a UV irradiation amount of 150 mJ/cm$^2$ using a UV illuminator set at a height of 60 mm from a coated surface to form a hard coat layer, thus a hard coat film of the present invention was prepared.

Example 2

A hard coat film was obtained in the same manner as example 1 except that the numbers of blending parts of the polyolefin based resin and the styrene-acryl based resin of the easy bonding layer of example 1 were changed to 95 parts/5 parts.

Example 3

A hard coat film was obtained in the same manner as example 1 except that the numbers of blending parts of the polyolefin based resin and the styrene-acryl based resin of the easy-bonding layer of example 1 were changed to 40 parts/60 parts.

Example 4

A hard coat film was obtained in the same manner as example 1 except that a thickness of the coated film of the easy-bonding layer of example 1 was changed to 0.1 μm.

Example 5

A hard coat film was obtained in the same manner as example 1 except that a thickness of the coated film of the easy-bonding layer of example 1 was changed to 1.0 μm.

Example 6

A hard coat film was obtained in the same manner as example 1 except that "polyolefin based resin UNISTOLE P-901 (trade name)" (solid content: 22%, manufactured by Mitsui Chemicals Inc.) was used in place of the polyolefin based resin SURFLEN P-1000 used in the easy-bonding layer of example 1.

Example 7

A hard coat film was obtained in the same manner as example 1 except that the cycloolefin film of example 1 was changed to "ARTON FILM FEKP100 (trade name) (manufactured by JSR Corporation) with a thickness of 100 μm.

Example 8

A hard coat film was obtained in the same manner as example 1 except that "UA-306H (trade name)" (solid content: 100%, the number of (meth)acryloyloxy groups: 3, weight-average molecular weight: 732, manufactured by KYOEISHA CHEMICAL Co., LTD.) was used in place of the urethane-acrylate based UV-curable resin "UV-7630B" used in the hard coat layer of example 1.

The hard coat layer coating material of the present example was used to form, on a polyethylene terephthalate film, a film on which a hard coat layer made of the ionizing radiation curable resin cured at a UV-ray amount of 50 to 1000 mJ/cm$^2$ was formed such that a coated film has a thickness of 2 μm. Then, when a test piece having width 15 mm×length 150 mm was prepared from said film and said test piece was subjected to a tensile test at a tensile speed of 50 mm/minute under the environment of temperature of 23° C. and humidity of 50% RH, an elongation rate until the crack was generated on the coated film was 8.2%.

Example 9

A hard coat film was obtained in the same manner as example 1 except that the numbers of blending parts of the polyolefin based resin and the styrene-acryl based resin of the easy-bonding layer of example 1 were changed to 97 parts/3 parts.

Example 10

A hard coat film was obtained in the same manner as example 1 except that the numbers of blending parts of the polyolefin based resin and the styrene-acryl based resin of the easy-bonding layer of example 1 were changed to 37 parts/63 parts.

Example 11

A hard coat film was obtained in the same manner as example 2 except that "ARUFON UG-4035 (trade name)" (solid content: 30%, glass transition temperature: 52° C., manufactured by TOAGOSEI Co., Ltd.) was used in place of the styrene-acryl based resin "ARUFON UG-4070 (trade name)" used in the easy-bonding layer of example 2.

Example 12

A hard coat film was obtained in the same manner as example 2 except that "ARUFON UG-4040 (trade name)" (solid content: 30%, glass transition temperature: 63° C., manufactured by TOAGOSEI Co., Ltd.) was used in place of the styrene-acryl based resin "ARUFON UG-4070 (trade name)" used in the easy-bonding layer of example 2.

Example 13

A hard coat film was obtained in the same manner as example 1 except that "EBECRYL-5129 (trade name)" (solid content: 100%, the number of (meth)acryloyloxy groups: 6, weight-average molecular weight: 800, manufactured by Daicel-Allnex Ltd.) was used in place of the urethane-acrylate based UV-curable resin "UV-7630B" (trade name) used in the hard coat layer of example 1.

The hard coat layer coating material of the present example was used to form, on a polyethylene terephthalate film, a film on which a hard coat layer made of the ionizing radiation curable resin cured at a UV-ray amount of 50 to 1000 mJ/cm$^2$ was formed such that a coated film has a thickness of 2 μm. Then, when a test piece having width 15 mm×length 150 mm was prepared from said film and said test piece was subjected to a tensile test at a tensile speed of 50 mm/minute under the environment of temperature of 23° C. and humidity of 50% RH, an elongation rate until the crack was generated on the coated film was 8.5%.

Example 14

A hard coat film was obtained in the same manner as example 1 except that "NK Oligo U-6LPA (trade name)" (solid content: 100%, the number of (meth)acryloyloxy groups: 6, weight-average molecular weight: 760, manufactured by Shin-Nakamura Chemical Co., Ltd.) was used in place of the urethane-acrylate based UV-curable resin "UV-7630B (trade name)" used in the hard coat layer of example 1.

The hard coat layer coating material of the present example was used to form, on a polyethylene terephthalate film, a film on which a hard coat layer made of the ionizing radiation curable resin cured at a UV-ray amount of 50 to 1000 mJ/cm$^2$ was formed such that a coated film has a thickness of 2 μm. Then, when a test piece having width 15 mm×length 150 mm was prepared from said film and said test piece was subjected to a tensile test at a tensile speed of 50 mm/minute under the environment of temperature of 23° C. and humidity of 50% RH, an elongation rate until the crack was generated on the coated film was 44.5%.

Comparative Example 1

A hard coat film was obtained in the same manner as example 1 except that the numbers of blending parts of the polyolefin based resin and the styrene-acryl based resin of the easy-bonding layer of example 1 were changed to 100 parts/0 part (that is, the styrene-acryl based resin was not used).

Comparative Example 2

A hard coat film was obtained in the same manner as example 1 except that the numbers of blending parts of the polyolefin based resin and the styrene-acryl based resin of the easy-bonding layer of example 1 were changed to 0 part/100 parts (that is, the polyolefin based resin was not used).

Comparative Example 3

A hard coat film was obtained in the same manner as example 1 except that "Art-Resin UN-904 (trade name)" (solid content: 100%, the number of (meth)acryloyloxy groups: 10, weight-average molecular weight: 4900, manufactured by Negami Chemical Industrial Co., Ltd.) was used in place of the urethane-acrylate based UV-curable resin "UV-7630B (trade name)" used in the hard coat layer of example 1.

The hard coat layer coating material of the present comparative example was used to form, on a polyethylene terephthalate film, a film on which a hard coat layer made of the ionizing radiation curable resin cured at a UV-ray amount of from 50 to 1000 mJ/cm$^2$ was formed such that a coated film has a thickness of 2 μm. Then, when a test piece having width 15 mm×length 150 mm was prepared from said film and said test piece was subjected to a tensile test at a tensile speed of 50 mm/minute under the environment of temperature of 23° C. and humidity of 50% RH, an elongation rate until the crack was generated on the coated film was 7.8%.

The respective hard coat films of examples and comparative examples prepared as described above were evaluated of the following items, and results thereof are shown in Table 1.

(1) Thickness of Coated Film

Formation thicknesses of the easy-bonding layers and the hard coat layers were measured using Thin-Film Analyzer F20 (trade name) (manufactured by Filmetric Inc.).

(2) Transparency

Total light transmittances of the hard coat films prepared in respective examples and comparative examples were measured according to a method shown in JIS K7136.

(3) Adhesiveness (Initial Adhesiveness and Temporal Adhesiveness)

The adhesiveness was evaluated in accordance with JIS-K5600-5-6. Further, in order to confirm the adhesiveness between the easy-bonding layer and the cycloolefin film, and the adhesiveness between the easy-bonding layer and the hard coat layer, one in which the easy-bonding layer is formed on the cycloolefin film was used to confirm the adhesiveness between the easy-bonding layer and the cycloolefin film, and one in which the easy-bonding layer and the hard coat layer are formed on the cycloolefin film was used to evaluate the adhesiveness between the easy-bonding layer and the hard coat layer.

First, regarding the adhesiveness (initial adhesiveness) between the easy-bonding layer and the cycloolefin film, under normal condition, that is, under normal temperature and normal humidity condition (23° C., 50% RH), using a crosscut peeling test tool, 100 crosscuts of 1 mm$^2$ were prepared, an adhesive tape No. 252 manufactured by Sekisui Chemical Co., Ltd. was stuck thereon, followed by uniformly pressing with a spatula, further followed by peeling in a 90 degree direction, and residual number of the easy-bonding layer was evaluated according to the following 4 grades.

Next, in the similar manner, the adhesiveness (initial adhesiveness) between the easy-bonding layer and the hard coat layer was evaluated.

Evaluation criteria was as follows, and test samples evaluated as ◎ and ○ were determined to be acceptable.

Evaluation Criteria

◎: 100 crosscuts, ○: from 99 to 95 crosscuts, Δ: from 94 to 50 crosscuts, and x: from 49 to 0 crosscuts Further, regarding the temporal adhesiveness, each of the hard coat films (one obtained by coating the hard coat layer on the easy-bonding layer) prepared in examples and comparative examples was stored for 30 days in a state set by a sample hanging tool in a fan dryer at 90° C., followed by taking out the sample, and the adhesiveness was evaluated in accordance with the JIS-K5600-5-6. The evaluation criteria were the same as the case of the above initial adhesiveness. Regarding this temporal adhesiveness, the adhesivenesses in all interfaces between the base material and the easy-bonding layer, and between the easy-bonding layer and the hard coat layer were evaluated.

(4) Thermal Crack Resistance

Each of the hard coat films prepared in examples and comparative examples was stored for 5 minutes in a state hanged by a sample hanging tool in a dryer at 100° C., followed by taking out, and the occurrence of the crack was visually evaluated. A degree of the occurrence of the crack was evaluated according to the following criteria. Test samples evaluated as "○" were determined to have excellent thermal crack resistance.

Evaluation Criteria

○: no crack occurrence, x: crack occurrence (5) Scratch Resistance

Each of the hard coat films prepared in examples and comparative examples was subjected to a reciprocation friction test of 10 times with steel wool #0000 under a load of 1 kg by a test method in accordance with JIS-K5600-5-10, and a damage degree was evaluated according to the following criteria. Here, test samples evaluated as ○ were determined to have excellent scratch resistance, also test samples evaluated as "Δ" may be used.

Evaluation Criteria

○: no scratch, Δ: slight scratches, x: innumerable scratches (6) Pencil Hardness The pencil hardness of each of the hard coat films prepared in examples and comparative examples was measured by a test method in accordance with JIS K5600-5-4. The hardness that does not generate scratch on a surface was recorded.

(7) Curl Characteristics (Curl Height)

Figure 2:
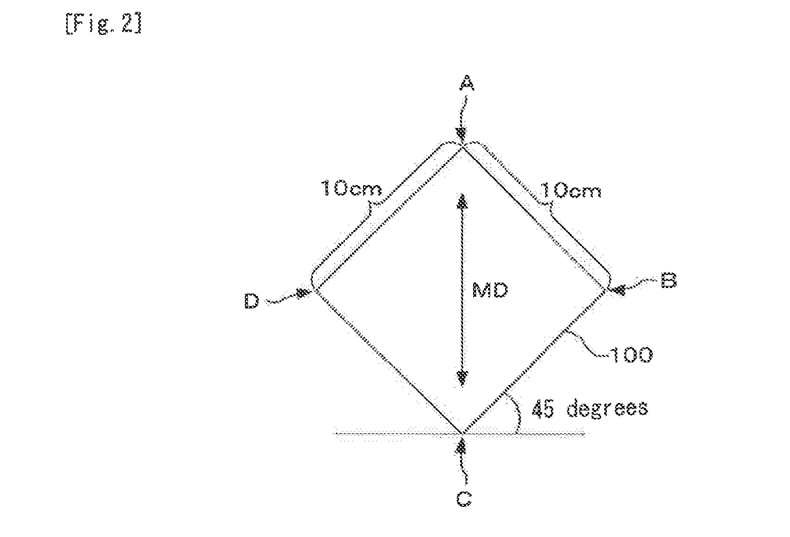
FIG. 2 is a diagram for describing a method for evaluating a curl height of the hard coat film.

From each of the hard coat films prepared in examples and comparative examples, a regular rhombus-shaped test piece 100 having a side of 10 cm was cut out with a coating direction (MD direction shown in FIG. 2) as a base axis as shown in FIG. 2, placed on a horizontal plane with a hard coat layer surface directed upward, stored for 30 minutes under the environment of 23° C. and 50% RH, followed by measuring heights from the horizontal plane of 4 warped-up apexes (A, B, C, D), and, an average value thereof as a curl height was evaluated according to the following criteria. The "Δ" or better is taken as a practically no problem range.

Evaluation Criteria

⊚: the curl height is 30 mm or smaller,
○: the curl height exceeds 30 mm and 40 mm or smaller,
Δ: the curl height exceeds 40 mm but a cylinder is not formed, and
x: the curl is large and warps up from each apex, and the test piece forms a cylinder.

TABLE 1

| | | Easy-bonding layer | | Hard coat layer | | Evaluation results of characteristics Initial adhesiveness | |
| --- | --- | --- | --- | --- | --- | --- | --- |
| Example | Base material | Resin composition | Formation thickness (μm) | Resin name | Number of functional groups | Base material/ Easy-bonding layer | Easy-bonding layer/Hard coat layer |
| Example 1 | ZEONOR | P-1000/UG4070 = 70/30 | 0.3 | UV-7630B | 6 | ⊚ | ⊚ |
| Example 2 | ZEONOR | P-1000/UG4070 = 95/5 | 0.3 | UV-7630B | 6 | ⊚ | ⊚ |
| Example 3 | ZEONOR | P-1000/UG4070 = 40/60 | 0.3 | UV-7630B | 6 | ○ | ⊚ |
| Example 4 | ZEONOR | P-1000/UG4070 = 70/30 | 0.1 | UV-7630B | 6 | ⊚ | ○ |
| Example 5 | ZEONOR | P-1000/UG4070 = 70/30 | 1.0 | UV-7630B | 6 | ⊚ | ⊚ |
| Example 6 | ZEONOR | P-901/UG4070 = 70/30 | 0.3 | UV-7630B | 6 | ⊚ | ⊚ |
| Example 7 | ARTON | P-1000/UG4070 = 70/30 | 0.3 | UV-7630B | 6 | ⊚ | ⊚ |
| Example 8 | ZEONOR | P-1000/UG4070 = 70/30 | 0.3 | UA-306H | 3 | ⊚ | ⊚ |
| Example 9 | ZEONOR | P-1000/UG4070 = 97/3 | 0.3 | UV-7630B | 6 | ⊚ | ⊚ |
| Example 10 | ZEONOR | P-1000/UG4070 = 37/63 | 0.3 | UV-7630B | 6 | Δ | ⊚ |
| Example 11 | ZEONOR | P-1000/UG4035 = 95/5 | 0.3 | UV-7630B | 6 | ⊚ | ○ |
| Example 12 | ZEONOR | P-1000/UG4040 = 95/5 | 0.3 | UV-7630B | 6 | ⊚ | ⊚ |
| Example 13 | ZEONOR | P-1000/UG4070 = 70/30 | 0.3 | EBECRYL-5129 | 6 | ⊚ | ⊚ |
| Example 14 | ZEONOR | P-1000/UG4070 = 70/30 | 0.3 | U-6LPA | 6 | ⊚ | ⊚ |
| Comparative example 1 | ZEONOR | P-1000/UG4070 = 100/0 | 0.3 | UV-7630B | 6 | ⊚ | ⊚ |
| Comparative example 2 | ZEONOR | P-1000/UG4070 = 0/100 | 0.3 | UV-7630B | 6 | X | ○ |
| Comparative example 3 | ZEONOR | P-1000/UG4070 = 70/30 | 0.3 | Art-Resin UN-904 | 10 | ⊚ | ⊚ |

| | Evaluation results of characteristics | | | | | |
| --- | --- | --- | --- | --- | --- | --- |
| Example | Temporal adhesiveness (%) 90° C. for 30 days | Transparency (%) | Thermal crack resistance | Scratch resistance | Pencil hardness | Curl |
| Example 1 | ⊚ | 91.9 | ○ | ○ | HB | Δ |
| Example 2 | ⊚ | 91.8 | ○ | ○ | HB | Δ |
| Example 3 | ○ | 91.9 | ○ | ○ | HB | Δ |
| Example 4 | ○ | 92.0 | ○ | ○ | HB | Δ |
| Example 5 | ⊚ | 91.9 | ○ | ○ | B | Δ |
| Example 6 | ⊚ | 91.8 | ○ | ○ | HB | Δ |
| Example 7 | ⊚ | 91.9 | ○ | ○ | HB | Δ |
| Example 8 | ⊚ | 91.9 | ○ | ○ | B | Δ |
| Example 9 | ⊚ | 91.6 | Δ | Δ | B | Δ |
| Example 10 | ⊚ | 91.8 | ○ | ○ | HB | Δ |
| Example 11 | ⊚ | 91.9 | ○ | ○ | B | Δ |
| Example 12 | ⊚ | 91.6 | ○ | ○ | HB | Δ |
| Example 13 | ⊚ | 91.5 | ○ | ○ | HB | ○ |
| Example 14 | ⊚ | 91.5 | ○ | Δ | B | ⊚ |
| Comparative example 1 | ⊚ | 91.9 | X | Δ | B | Δ |
| Comparative example 2 | X (*1) | 91.8 | ○ | ○ | HB | Δ |
| Comparative example 3 | ⊚ | 91.5 | X | ○ | HB | X |

(*1): Peeling failure occurred at an interface between the base material and the easy-bonding layer.

As obvious from the results of Table 1, according to examples of the present invention, by means of the easy-bonding layer containing (using jointly) the mixture of the polyolefin based resin and the styrene-acryl based resin, the hard coat film that may improve the adhesiveness with both the cycloolefin film and the hard coat layer, has excellent temporal adhesiveness under normal condition and under the moisture and heat resistant condition and has no crack occurrence under the heat resistant condition may be obtained. Further, when the ionizing radiation curable resin that contains 3 or more (meth)acryloyloxy groups in one molecule is used as the ionizing radiation curable resin in the hard coat layer, the hard coat film having excellent surface hardness (scratch resistance, pencil hardness) may be obtained. Furthermore, when specific ionizing radiation curable resin is used in the hard coat layer to control the rate of elongation (elongation rate) of the hard coat layer in the range of the predetermined range, the hard coat film that may sufficiently suppress the curl and has excellent processing suitability may be obtained (particularly, examples 13 and 14).

Still further, it is shown that the effect of the present invention is remarkably exhibited when the blending ratio (parts by weight) of the polyolefin based resin and the styrene-acryl based resin in the easy-bonding layer is in the range of from 95/5 to 40/60.

By contrast, comparative examples 1 and 2 where the polyolefin based resin and the styrene-acryl based resin are not jointly used in the easy-bonding layer had a problem that the crack tends to occur under the heat resistant condition (comparative example 1) and a problem that the adhesiveness in particular with the cycloolefin film and the temporal adhesiveness under the moisture and heat resistant condition is poor (comparative example 2). Further, in comparative example 3 where the ionizing radiation curable resin having the weight-average molecular weight of 4900 is used, the crack tends to occur under the heat resistant condition, further the curl is large and the processing suitability is poor.

REFERENCE SIGNS LIST 1 cycloolefin film
2 easy-bonding layer
3 hard coat layer
10 hard coat film

The invention claimed is:

1. A hard coat film comprising:
a cycloolefin film; and
an easy-bonding layer and a hard coat layer provided in this order on one surface of the cycloolefin film,
wherein a thickness of the cycloolefin film is in the range of from 60 μm to 100 μm;
wherein a thickness of the easy-bonding layer is in the range of from 0.1 μm to 1.0 μm;
wherein a thickness of the hard coat layer is in the range of from 1.0 μm to 15.0 μm;
wherein the cycloolefin film comprises a film of a cycloolefin copolymer or a film of a cycloolefin polymer, which is a (co) polymer having an alicyclic structure in a molecular structure by polymerizing cycloolefin units alternately or randomly in a polymer skeleton, and containing at least one kind of compound selected from the group consisting of a norbornene-based compound, a monocyclic olefin, a cyclic conjugate diene and a vinyl alicyclic hydrocarbon;
wherein the easy-bonding layer provides an adhesiveness between the cycloolefin film and the hard coat layer,
wherein the easy-bonding layer is configured to decrease a thermal contraction difference between the easy-bonding layer and the hard coat layer under a heat resistant condition, the heat resistant condition comprising preservation at 100° C. for 5 minutes,
wherein the easy-bonding layer includes a mixture of:
(A) a polyolefin based resin that has a weight-average molecular weight of 10,000 or larger and 200,000 or smaller and consists of (1) an ethylene-propylene copolymer or (2) a propylene-butene copolymer; and
(B) a styrene-acryl based resin that has a glass transition temperature of 52° C. or larger and 63° C. or less,
wherein the hard coat layer includes an ionizing radiation curable resin having a weight-average molecular weight of 732 or larger and 2200 or smaller and containing a polyfunctional acrylate having 3 or more and 6 or less (meth)acryloyloxy groups in one molecule,
wherein a blending ratio (parts by weight) of the polyolefin based resin and the styrene-acryl based resin in the easy-bonding layer is in the range of from 95/5 to 40/60, and
wherein the easy-bonding layer further comprises inorganic or organic particles having a particle size of 0.05 μm to 0.20 μm and a blending amount (parts by weight) of the resins constituting the easy-bonding layer to the inorganic or organic particles is 99.8/0.2 to 95.0/5.0.

2. The hard coat film according to claim 1, wherein the hard coat layer satisfies the following conditions:
(1) when a coated film is formed by forming a hard coat layer made of the ionizing radiation curable resin on a polyethylene terephthalate film, wherein the hard coat layer is cured by a UV-ray amount of from 50 to 1000 mJ/cm$^2$, and wherein the coated film has a thickness of 2 μm, and
(2) when a test piece having width 15 mm×length 150 mm is prepared from said coated film and said test piece is subjected to a tensile test at a tensile speed of 50 mm/minute under an environment of temperature of 23° C. and humidity of 50% RH, an elongation rate until a crack is generated on the coated film is 8% or larger and 45% or smaller.

3. The hard coat film according to claim 1, wherein the inorganic particles are selected from the group consisting of alumina, zinc oxide, silica, titanium oxide, and cerium oxide, and the organic particles are selected from the group consisting of acryl, a melamine/formamide condensate, polyethylene, styrene-acryl, and polyester.

* * * * *